(12) United States Patent
Brabenec

(10) Patent No.: US 6,427,429 B1
(45) Date of Patent: Aug. 6, 2002

(54) MULTIPLE STRING LAWNMOWER

(76) Inventor: William Brabenec, Birch Trails, Box 66, Attica, MI (US) 48412

( * ) Notice: Subject to any disclaimer, the term of this patent is extended or adjusted under 35 U.S.C. 154(b) by 8 days.

(21) Appl. No.: 09/840,509

(22) Filed: Apr. 23, 2001

(51) Int. Cl.[7] .............................................. A01D 55/00
(52) U.S. Cl. .............................................. 56/12.7; 56/6
(58) Field of Search ........................... 56/6, 12.7, 13.6, 56/16.5, 17.1, 255, 295, 10.4, DIG. 10; 30/276, 347, 380

(56) References Cited

U.S. PATENT DOCUMENTS

| | | |
|---|---|---|
| 4,035,912 A | 7/1977 | Ballas et al. |
| 4,104,797 A | 8/1978 | Ballas |
| 4,205,439 A | 6/1980 | Sweet |
| 4,232,505 A * | 11/1980 | Walto ..................... 56/12.7 |
| 4,242,855 A | 1/1981 | Beaver, Jr. |
| 4,267,686 A * | 5/1981 | Heath ..................... 56/12.7 |
| 4,395,865 A | 8/1983 | Davis, Jr. et al. |
| 4,429,515 A | 2/1984 | Davis, Jr. et al. |
| 4,452,033 A * | 6/1984 | Scramuzza ............. 56/12.7 |
| 4,487,003 A * | 12/1984 | Matthews et al. ....... 56/13.6 |
| 4,756,147 A | 7/1988 | Savell |
| 5,020,309 A | 6/1991 | Hopkins |
| 5,065,566 A * | 11/1991 | Gates .................... 56/12.7 |
| 5,101,615 A | 4/1992 | Fassauer |
| 5,146,733 A * | 9/1992 | Klaeger .................. 56/6 |
| 5,210,996 A | 5/1993 | Fassauer |
| 5,224,552 A | 7/1993 | Lee et al. |
| 5,303,532 A | 4/1994 | Phillips |
| 5,471,824 A * | 12/1995 | Neely ..................... 56/10.4 |
| 5,572,856 A | 11/1996 | Ku |
| 5,577,374 A | 11/1996 | Huston |
| 5,581,986 A | 12/1996 | Calver |
| 5,771,670 A | 6/1998 | Perry |
| 5,910,091 A | 6/1999 | Iida et al. |
| 6,105,253 A | 8/2000 | Kolbert |
| 6,122,832 A | 9/2000 | Lee |
| 6,182,428 B1 * | 2/2001 | Hatfield .................. 56/12.7 |
| 6,185,916 B1 * | 2/2001 | Johnson ................. 56/12.7 |

* cited by examiner

Primary Examiner—Robert E. Pezzuto
(74) Attorney, Agent, or Firm—Howard & Howard

(57) ABSTRACT

A multi-string lawnmower that has a multi-tiered housing to which is mounted to at least one electric motor coupled to a battery. There are a plurality of mandrel shafts arranged in rows mounted to bearings on the underside of the housing. The mandrel shafts are associated with roller guides and engage a serpentine belt, that is powered by the at least one electric motor. The serpentine belt imparts rotational motion to the mandrel shafts such that adjacent shafts rotate in opposite directions. The cutting elements or strings are attached to the mandrel shafts and are held in place by centrifugal force.

13 Claims, 3 Drawing Sheets

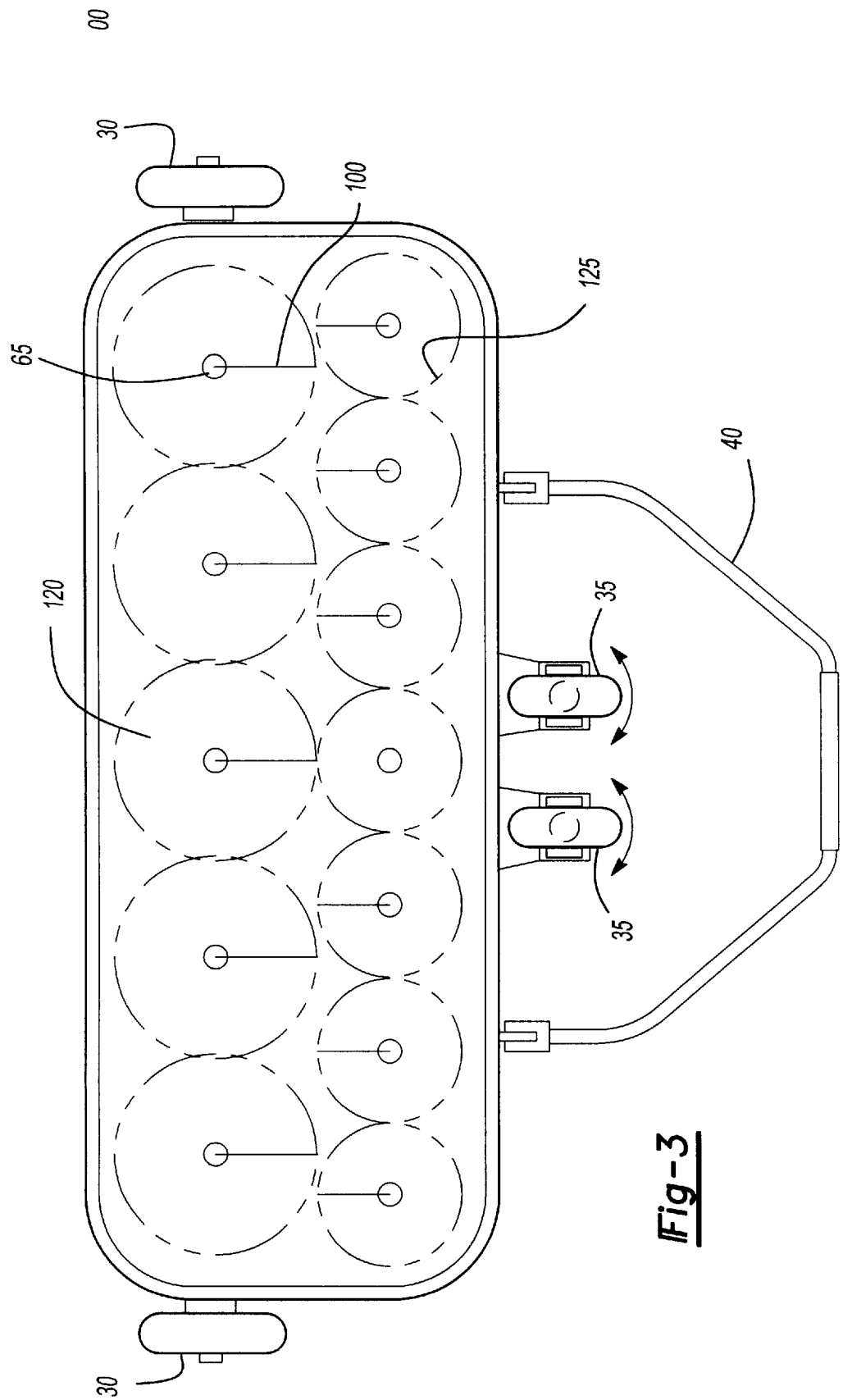

MULTIPLE STRING LAWNMOWER

BACKGROUND OF THE INVENTION

This invention relates to lawn mowing devices, and with more particularity the invention relates to lawn mowing devices having multiple string cutter elements.

Traditional gas powered lawnmowers include both the push and riding type of mowers. The riding mowers typically provide a much larger cutting path but can cost several thousand dollars. Large riding mowers require constant maintenance including tune-ups, blade sharpening, filters that need replacing, and other such maintenance tasks. Gas powered lawnmowers also produce environmentally unfriendly emissions due to the combustion of gasoline needed to power the device. The gasoline engines used typically result in the production of a sizeable amount of noise, which in and of itself acts as a form of pollution.

Large gas powered lawnmowers utilizing metal blades as the cutting element also may pose a danger, as they may propel small objects such as rocks and other forms of debris that may be present in the lawn cutting path.

It is therefore an object of the present invention to provide an electric powered lawn mowing device that is environmentally friendly and does not produce combustible emissions or noise associated with the use of a gas powered engine. It is also an object of the present invention to replace the large metal blades associated with most gas powered lawnmowers with a plurality of cutting strings which would not propel objects, as is common with a metal blade design. It is also an object of the present invention to provide a lightweight, hand propelled mower that will cut as wide a swatch as a large, gas-powered lawn mower. It is also an object of the present invention to produce a cost-effective lawn-mowing device that is easy to use and requires a minimal amount of maintenance.

SUMMARY OF THE INVENTION

There is provided a lawn mowing device which cures those deficiencies outlined above by providing a multi-string lawnmower that includes a multi-tiered housing having upper and lower tiers with a middle tier defined by the spacing of the upper and lower tiers. The housing further includes front and rear wheels to allow for the movement of the lawn-mowing device. A handle is attached to the housing to provide the user a means of propelling the lawnmower, as well as to allow for directing the path of the lawnmower. A battery is disposed on the upper tier of the housing and is connected to at least one electric motor that is also disposed on the upper tier. The motor is connected to a shaft, which in turn is coupled to a pulley. A plurality of mandrel shafts are connected to bearing assemblies that are disposed on a lower surface of the upper tier. A serpentine belt engages the pulley and also engages the plurality of mandrel shafts to impart rotational motion to the mandrel shafts. A plurality of roller guides are positioned in cooperative relationship with the mandrel shafts to allow for engagement of the mandrel shafts with the serpentine belt. The serpentine belt engages the mandrel shafts in such a manner that the rotation of adjacent shafts are in opposite directions.

BRIEF DESCRIPTION OF THE DRAWINGS

The various advantages of the present invention will become apparent to one skilled in the art by reading the following specification and claims and by referencing the following drawings in which:

FIG. 3 is a top view of the multi-string lawnmower of the present invention depicting the cutting radiuses of the various cutting elements;

DETAILED DESCRIPTION OF THE PREFERRED EMBODIMENT

Figure 1:
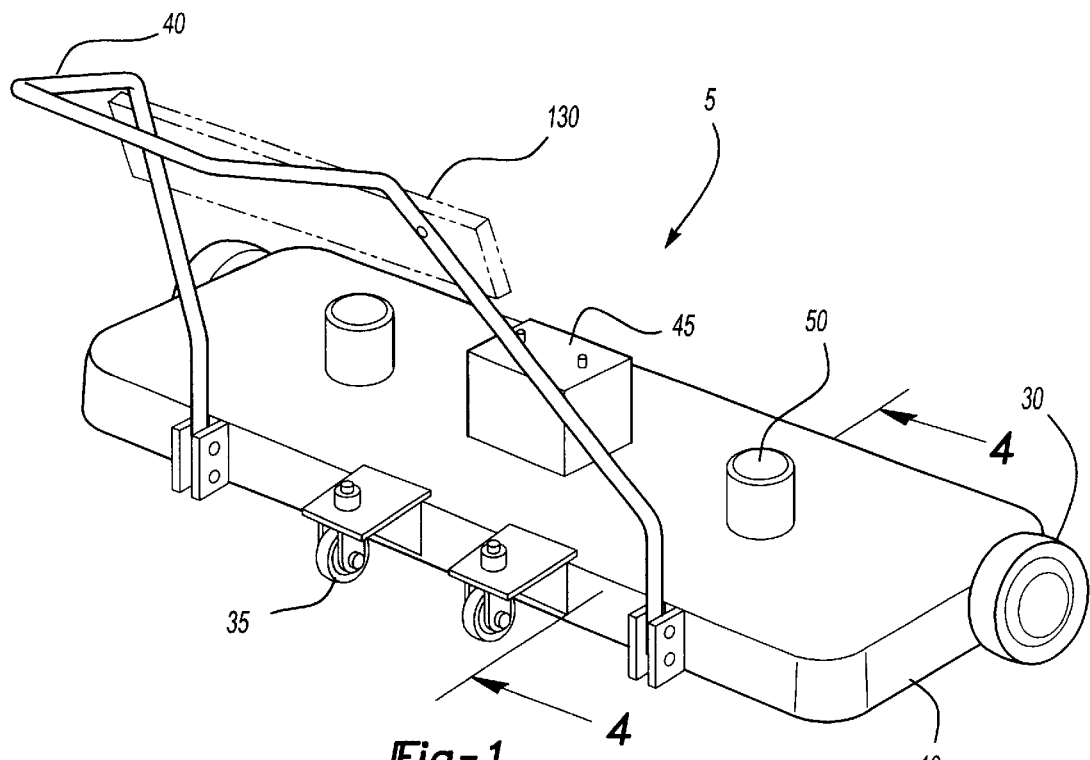
FIG. 1 is a top view of the multi-string lawnmower of the present invention.
Figure 4:
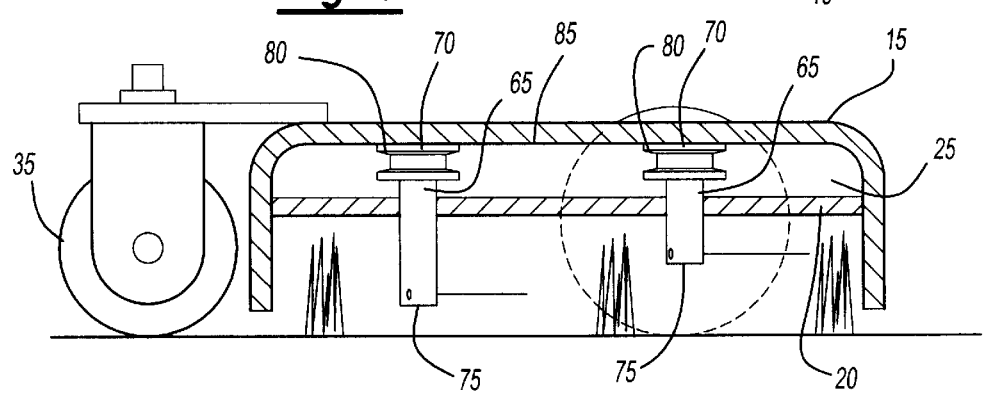
FIG. 4 is a front view of the multi-string lawnmower of the present invention.

Referring to FIGS. 1 and 4, a multiple string lawnmower 5 is depicted. The multiple string lawnmower 5 includes a multi-tiered housing 10 including upper 15 and lower 20 tiers and also a middle 25 tier defined by a spacing of the upper 15 and lower 20 tiers. The multi-tiered housing 10 is preferably made of a lightweight and rigid glass reinforced plastic.

Front 30 and rear 35 wheels are disposed on the multi-tiered housing 10 for allowing movement of the multi-string lawnmower 5. As can be seen in FIG. 1, the front wheels are placed on opposite sides of the housing 10 and are aligned to provide a straight travel path for the mower 5. The rear 35 wheels are disposed on a rear of the housing 10 and are spaced near the center line of the rear of the housing 10 to provide for ease in pivoting the lawnmower 5 while in operation. A handle 40 is attached to the multi-tiered housing 10 to provide a means of propelling the multi-string lawnmower 5 as well as to allow for direction controlled by an operator of the lawnmower.

A battery 45 is disposed on the upper 15 tier of the multi-tiered housing 10 and is connected to at least one electric motor 50, although two are depicted in the preferred embodiment shown in FIGS. 1 through 4. The battery 95 may be an automatic or a manual battery commonly found in the United States. The electric motor 50 is coupled to a shaft 55. The shaft 55 is in turn connected to a pulley 60 which engages a serpentine belt 90, as will be described in more detail below.

Figure 2:
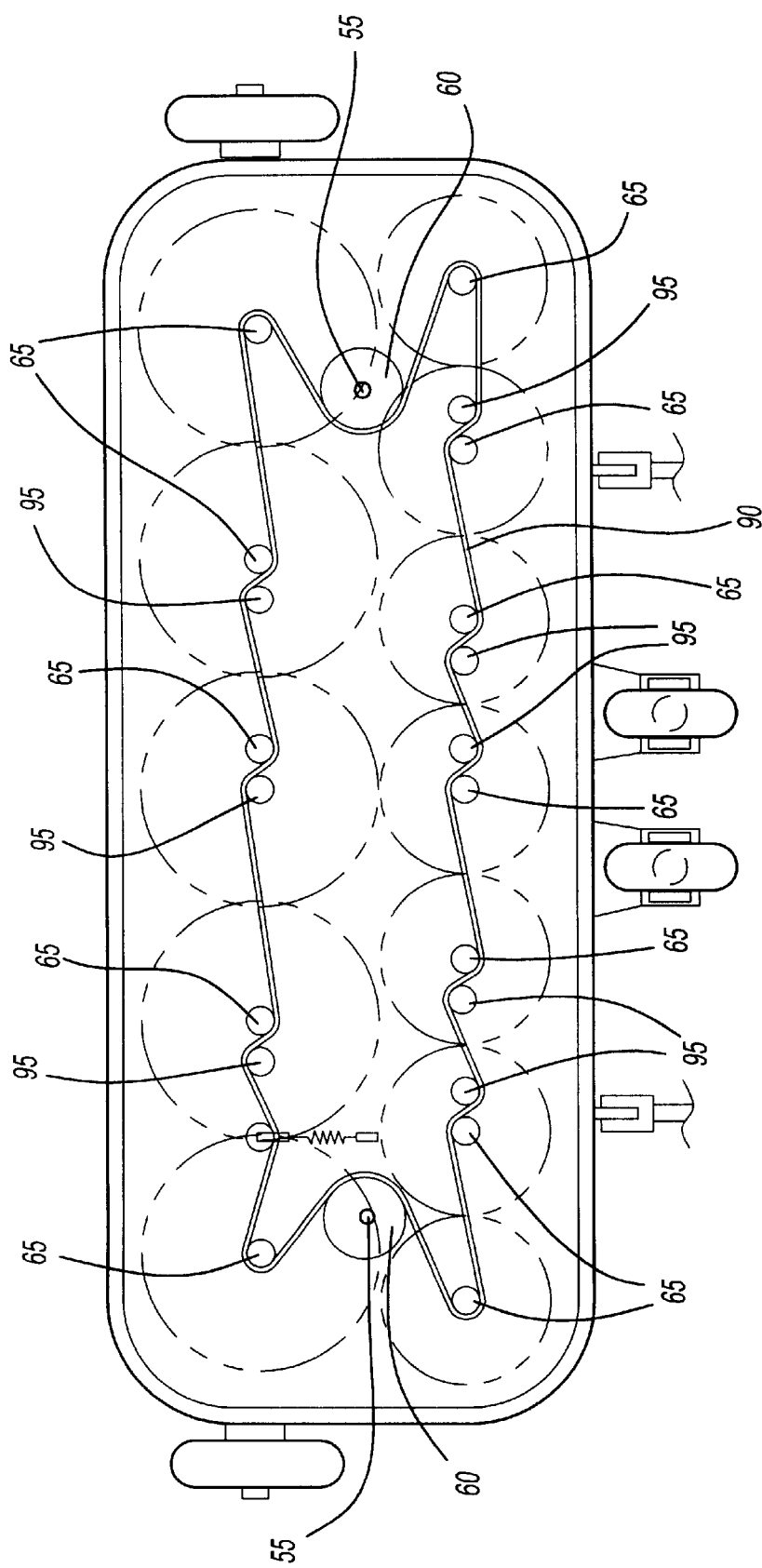
FIG. 2 is a bottom view of the multi-string lawnmower of the present invention.

With reference to FIGS. 2 and 4, there are shown a plurality of mandrel shafts 65 having first 70 and second 75 ends. The mandrel shafts extend through the lower 20 and middle 25 tiers and connect to bearing assemblies 80 that are disposed on a lower surface 85 of the upper tier 15. A plurality of roller guides 95 are positioned in a cooperative relationship with the mandrel shafts 65 to facilitate the engagement of the mandrel shafts 65 with the serpentine belt 90. As can be seen in FIG. 2, the serpentine belt 90 is coupled to the pulleys 60 which provide a rotational drive to the serpentine belt 90. The serpentine belt 90 engages the plurality of mandrel shafts 65 and the plurality of roller guides 95 such that the direction of rotation of adjacent mandrel shafts are in opposite directions. There is also included a constant tension pulley 86 for preventing the serpentine belt 90 from becoming slack. The use of a serpentine belt 90 allows for the engagement of any number of mandrel shafts 65, which in turn allows for various dimensions of lawn-mowing devices 5. The serpentine belt 90 should be made of a long wearing material, such as those commonly used in the automobile industry.

Figure 5:
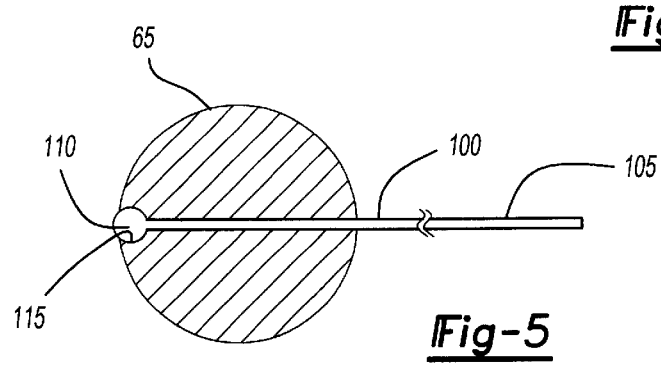
FIG. 5 is an exploded view of the interengagement of the mandrel shaft and cutting string of the present invention.

With reference to FIG. 5, the mandrel shafts 65 have holes 67 formed radially through them radially on their second ends 75. There is also a counter-bore 82 formed on the hole 67 to allow for the engagement of the cutting elements 100. The cutting elements 100 are high density, glass reinforced, plastic strings 105 that have stops 110 formed on one end. The strings 105 are inserted through the hole 67 and the stops 110 are received within the counter-bore 82 to provide a cutting element. The centrifugal force generated by the rotation of the mandrel shafts 65 maintain the strings 105 within the mandrel shafts 65. The preferred rotation of the mandrel shafts is from 5,000 to 8,000 rpm and is sufficient to maintain the strings 105 in contact with the mandrel shafts 65.

With reference to FIGS. 2 and 3, the mandrel shafts 65 are positioned in first 120 and second 125 rows in relation to the multi-tiered housing 10. The number of mandrel shafts 65 in the first row 120 is less than the number of mandrel shafts 65 in the second row 125. This relationship is maintained, as it is preferred that the length of the string, which corresponds to the radius of the cut path of the cutting element, in the first row, is larger than the length of the string in the second row 125. This design allows for the rpm of the cutting elements 100 in the first row to be greater than that of the cutting elements 100 in the second row 125. In this manner, the first row acts as a rough cutting row that can handle the thicker vegetation first encountered, while the second row acts as a finish or final cutting row that completes the cutting of the vegetation of the strings 105. A preferred length corresponding to a cutting radius in the first row 120 is 6 inches, while a preferred length of the strings 105 corresponding to a cutting radius in the second row 125 is 4¼ inches.

The height of the cutting elements 100 in the first row 120 is higher than that of cutting elements 100 in the second row 125 in relation to a cutting surface. Again, this allows for a leading rough-cut by the cutting elements 100 in the first row 120 and a finish cut by the cutting elements 100 in the second row 125.

With reference to FIG. 3, it can be seen that the cutting radiuses of the cutting elements 100 in the first row 120 overlap the cutting radiuses of the cutting elements 100 in the second row 125, such that if one string 105 is broken, the integrity of the cutting path would be maintained by the cutting string 105 in the front 120 or back row 125. As referenced above, the mandrel shafts 65 adjacent to one another rotate in opposite directions, such that the cutting elements 100 of adjacent mandrel shafts 65 do not interfere with each other. The rotation of the mandrel shafts 65 adjacent to each other in opposite directions also provides for the creation of a turbulence under the housing 10 that will capture and agitate the grass clippings and cut them repeatedly, resulting in a mulching effect.

As shown in FIG. 4, the multi-string lawnmower 5 of the present invention may also include a photovoltaic panel 130 attached to the handle 40 that is connected with the battery 45. The photovoltaic panel 130 would recharge the battery 45 when the lawnmower is exposed to a source of light.

It is also envisioned that a number of the multiple string lawnmowers 5 of the present invention may be yoked together and attached to a means of locomotion to provide a larger cut path for farm or municipality type applications. The multiple string lawnmowers 5 may be powered by a single battery from a common source or may be powered by individual batteries. The combination of the yoked lawnmowers may be towed or otherwise moved with any number of vehicles including electric golf carts or the like.

While a preferred embodiment is disclosed, a worker in this art would understand that various modifications would come within the scope of the invention. Thus, the following claims should be studied to determine the true scope and content of this invention.

What is claimed is:

1. A multiple string lawn mower comprising:
   a) a multi-tiered housing including upper and lower tiers and a middle tier defined by a spacing of said upper and lower tiers;
   b) front and rear wheels disposed on said housing for allowing movement of said lawn mower;
   c) a handle attached to said multi-tiered housing
   d) a battery disposed on said upper tier;
   e) at least one electric motor disposed on said upper tier and in communication with said battery, said motor coupled to a shaft wherein said shaft is coupled to a pulley;
   f) a plurality of mandrel shafts having first and second ends, said mandrel shafts extending through said lower and middle tiers and wherein said first ends of said mandrel shafts are operably connected to bearing assemblies disposed on a lower surface of said upper tier;
   g) a serpentine belt engaging said pulley and engaging said plurality of mandrel shafts for imparting rotational motion to said mandrel shafts; and
   h) a plurality of roller guides positioned in cooperative relationship with said mandrel shafts for facilitating engagement of said mandrel shafts with said serpentine belt;
   said serpentine belt engaging said mandrel shafts such that the rotation of adjacent shafts are in opposite directions.

2. The multiple string lawn mower of claim 1 further including a plurality of cutting elements coupled to said mandrel shafts.

3. The multiple string lawn mower of claim 2 wherein said cutting elements comprise high density glass reinforced plastic strings having stops formed on one end.

4. The multiple string lawn mower of claim 3 wherein said second ends of said plurality of mandrel shafts include counterbored holes formed radially therethrough.

5. The multiple string lawn mower of claim 4 wherein said strings are inserted through said counterbored holes in said second ends of said plurality of mandrel shafts such that said stops are housed in said counterbored holes.

6. The multiple string lawn mower of claim 3 wherein said plurality of mandrel shafts are positioned in first and second rows in relation to said multi-tiered housing.

7. The multiple string lawn mower of claim 6 wherein the number of said plurality of mandrel shafts in said first row is less than the number of said plurality of mandrel shafts in said second row.

8. The multiple string lawn mower of claim 7, wherein said number of said plurality of mandrel shafts in said fist row is 5 and said number of said plurality of mandrel shafts in said second row is 7.

9. The multiple string lawn mower of claim 6 wherein lengths of said plurality of strings corresponding to cutting radiuses in said first row are larger than lengths corresponding to cutting radiuses of said plurality of strings in said second row.

10. The multiple string lawn mower of claim 9 wherein the length of said plurality of strings in said first row is 6 inches and the length of said plurality of strings in said second row is 4¼ inches.

11. The multiple string lawn mower of claim 6 wherein a height in relation to a cutting surface of said plurality of said strings in said first row is greater than a height of said plurality of strings in said second row.

12. The multiple string lawn mower of claim 1 further including a photovoltaic panel attached to said handle and to said battery for recharging said battery.

13. The multiple string lawnmower of claim 1, wherein said at least one electric motor comprises two electric motors.

* * * * *